June 23, 1964    C. J. DELBRIDGE    3,138,274
PITCH-CONTROLLED PUSH-OFF STACKER
Filed July 25, 1960    2 Sheets-Sheet 1
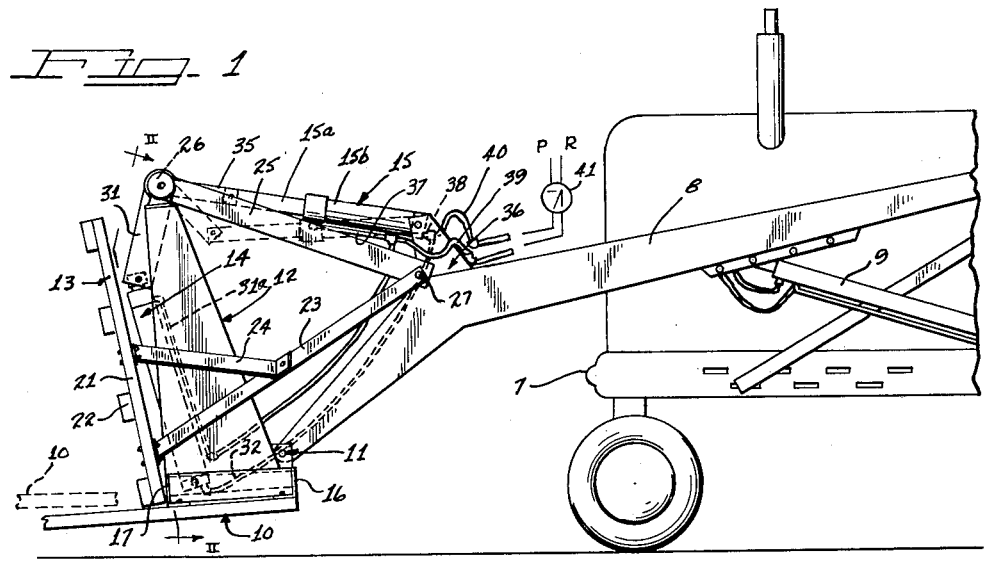
Inventor
Carleton J. Delbridge

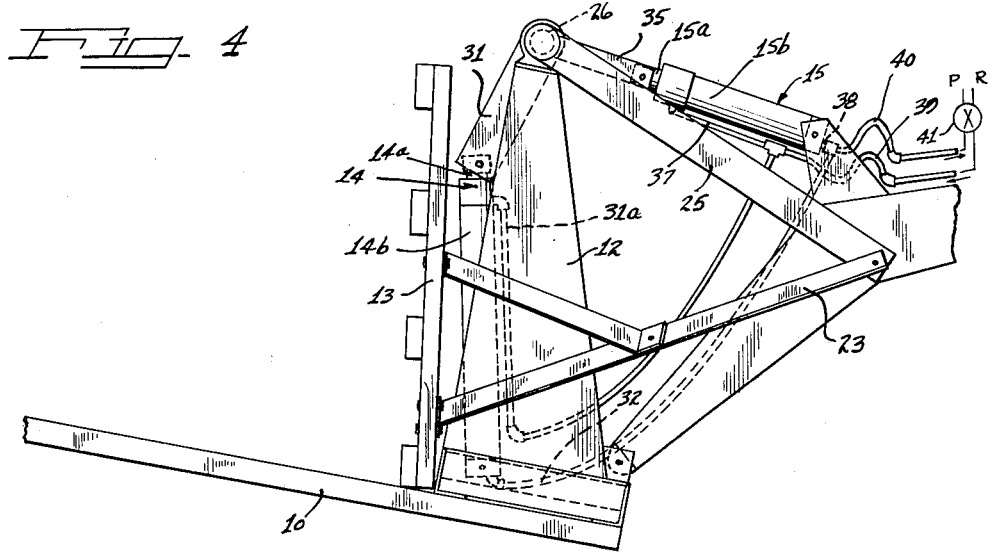

United States Patent Office 3,138,274
Patented June 23, 1964

3,138,274
PITCH-CONTROLLED PUSH-OFF STACKER
Carleton J. Delbridge, Sioux Falls, S. Dak., assignor to Du Al Manufacturing Co., Sioux Falls, S. Dak., a corporation of South Dakota
Filed July 25, 1960, Ser. No. 45,024
4 Claims. (Cl. 214—140)

This invention relates to improvements in lift mechanisms for attachment to vehicles such as hay loaders and stackers which are mounted on the front of a tractor for picking up hay and transporting it and piling it on a stack.

In particular the invention contemplates the provision of arm means for mounting on the front of a vehicle with a sweep pivotally mounted on the arm means and a push-off for movement along the sweep to discharge the load. A first hydraulic piston and cylinder is mounted on the sweep and operates a pivotal shaft mounted on uprights on the sweep for moving the push-off outwardly and returning it. A second hydraulic piston and cylinder is mounted on the arm means and connects to the upright to pivot the sweep.

A feature of the invention is the provision of means for permitting floating movement of the sweep when it is moved along the ground, principally in the form of a link pivotally connected to the shaft for independent pivotal movement and pivotally connected to the second piston and cylinder so that the link and cylinder can drop downwardly as the sweep rides over obstacles on the ground to obtain free floating movement thereof.

Another feature of the invention is the provision of a single hydraulic fluid supply for both of the pistons wherein one line is connected to the upper end of both pistons and another line connected to the lower end of both pistons and a single selective control valve pressurizes either line so that when one line is pressurized the sweep pivots downwardly and the push-off moves outwardly, when the other line is pressurized the push-off is moved rearwardly and the sweep tilted upwardly, and when pressure is relieved in both lines the sweep tilts downwardly by gravity for free floating action.

Accordingly, an object of the present invention is to provide an improved lift mechanism provided with a floating action which permits the unit to be moved over uneven ground or pushed upwardly without resistance.

Another object of the invention is to provide an improved and simplified fluid pressure operated system for a lift mechanism wherein a single control valve can be used, wherein the hydraulic pressure system of a tractor can be used without the provision of additional sources of pressure or additional valves, wherein the number of lines required are reduced, and wherein plural actions can be achieved with a single setting of a control valve.

A further object of the invention is to provide a lift mechanism which is simplified in construction and operation for decreased cost of manufacture, a longer operating life, and improved reliability.

Other objects and advantages will become more apparent with the teaching of the principles of the invention in connection with the disclosure of the preferred embodiment thereof in the specification, claims and drawings, in which:

FIG. 1 is a side elevational view of a lift mechanism constructed in accordance with the principles of the present invention mounted on the front end of a tractor;

FIG. 2 is a vertical sectional view taken substantially along line II—II of FIGURE 1;

FIGURE 3 is a fragmentary sectional view taken substantially along line III—III of FIGURE 2;

FIGURE 4 is a side elevational view of the lift of FIGURE 1 showing the parts in a different operating position; and FIGURE 5 is another view of the mechanism of FIGURES 1 and 4 showing the parts in still another operating position.

As shown on the drawings:

As illustrated in FIGURE 1, a tractor 7 pivotally supports arm means in the form of side booms 8 and 8a, FIGURE 2. The arm means are elevated and lowered by suitable hydraulic piston and cylinder assemblies 9 also mounted on the tractor. The tractor will be provided with a hydraulic pressure system and a control valve for operating the piston and cylinders 9, and another valve, which will later be described in detail, operates the mechanism mounted on the end of the arm means.

A sweep or fork 10 is pivotally supported at 11 on the arm means 8 and 8a and has uprights 12 and 12a extending above the sweep. A push-off or ejector 13 is arranged to slide along the sweep for discharging a load. The sweep is operated by a first fluid pressure power operator 14 and the sweep is pivotally moved by a second fluid pressure power operator 15, with said power operators being shown in the preferred form as cylinders with pistons therein.

The sweep 10 is pushed along the ground by the tractor 7 and floats over irregularities on the ground. When a load of material such as hay has been gathered on the sweep, the arm means 8 and 8a are raised, the sweep 10 is tilted up to the position of FIGURE 4, the tractor is driven to a stack and the arm means are then raised to the level of the top of the stack. At that point the push-off is moved forwardly on the sweep to discharge the load, and then the push-off is pulled back to the position of FIGURE 4 and the arm means are dropped for returning to the field to pick up another load of hay.

In greater detail, the sweep conveniently incorporates a pair of angle members 16 and 17 which extend across the sweep. Tines 18 are suitably secured to the sweep such as by being bolted to the base of the angle members 16 and 17, and the sweep may be provided with side rails 19 and 20.

The push-off 13 is in the form of a gate having vertical members 21 with horizontal members 22 attached thereto. The push-off is supported and operated by arms 23 and 23a, FIGURES 1 and 2 with side reinforcing bracket arms 24 and 24a, each of which are bolted to the push-off. The arms 23 and 23a are operated by upper pivotal arms 25 and 25a secured to a cross shaft 26 which is pivotally mounted at the top of the upright or frame members 12 and 12a. The upper arms 25 and 25a are pivotally connected to the arms 23 and 23a by pivot pins 27 and 27a. When the shaft 26 is pivoted the arms 25 and 25a pivot from the position of FIGURES 1 and 4 to the position of FIGURE 5 to push the arms 23 and 23a outwardly thus moving the push-off outwardly.

The shaft 26 is supported by auxiliary frame members 28 and 28a secured to the upright frame members 12 and 12a, with shaft support bearings 29 and 29A on members 28 and 28a, and shaft support bearings 30 and 30a at the upper ends of the uprights 12 and 12a.

For pivoting the shaft 26 and thus moving the push-off, an operating arm 31 shown as having two side members, is pivotally connected to a piston 14a slidable in a cylinder 14b and the piston and cylinder together provide the first power operator 14. The cylinder 14b is mounted on a support 17a on the sweep. An upper fluid pressure line 31a connects to the upper end of the cylinder 14b for moving the push-off rearwardly on the sweep, and a lower fluid pressure line 32 connects to the base of the cylinder 14b for moving the push-off forwardly on the sweep.

The second power operator 15 includes a hydraulic cylinder 15b with a piston 15a therein. The piston 15a is pivotally connected to a link 35 shown as having parallel side flat bars and the link is pivotally connected to the shaft 26 for pivotal movement thereon. The cylinder 15b is pivotally connected at its base to a cross member 36 supported on brackets and extending between the arm means 8 and 8a.

With the above arrangement, when the piston 15a is fully extended, and the sweep 10 moves upwardly such as to the dotted line position of FIGURE 1 by riding over a rise on the ground, the link 35 and the power operator 15 will drop down freely to the dotted line position. Thus, the position of the piston 15a and the cylinder 15b can be fixed and yet the sweep 10 is free to pivot upwardly and the relationship between the parts is not rigid. This of course will not adversely affect the push-off which remains in its position thereby facilitating free floating action of the sweep 10 as it is pushed across a field and also facilitating floating action of the sweep when it is set down on a surface or rested on the top of a stack. The push-off will stay in the retracted position as long as the sweep 10 does not tip forwardly sufficiently far to let the push-off slide forwardly.

The cylinder 15b has a pressure line 37 connected to its upper end and a pressure line 38 connected to its lower end. Pressurized hydraulic fluid is supplied simultaneously to both of the cylinders 14b and 15b through either a first pressure line 39 or a second pressure line 40. The first pressure line 39 is connected to lines 31a and 37 leading to the upper or head ends of the cylinders. The second pressure line 40 connects to the lines 32 and 38 leading to the lower ends of the cylinders. A valve 41 connects to the lines 39 and 40 to selectively pressurize them or vent them through a pressure line P or a return line R. The lines P and R respectively connect to the pressure system of the tractor and lead back to the reservoir for the pressure pump of the tractor pressure system.

In the position of the valve as shown schematically in FIGURE 1, the lift mechanism is ready for sweeping operation to pick up a load. The first and second pressure lines 39 and 40 are both vented to the return line R. If the lift mechanism is in the position of FIGURE 4 when the venting occurs, the sweep 10 will settle by gravity while hydraulic fluid flows from the head end of the cylinder 15b to the base end. This flow will continue until the piston 15a is at its fully extended position, or until the sweep 10 touches the ground. The push-off 13 stays in its retracted position since there are no forces which would move the piston 14a out of its cylinder 14b (although it is free to move relative to the cylinder).

When a load has been gathered, the valve is set to the position of FIGURE 4 thereby connecting the first line 39 to pressure P and venting the second line 40. This directs pressurized hydraulic fluid to the upper end of both of the cylinders 14b and 15b. The piston 14a has already withdrawn into its cylinder, so that the hydraulic fluid will draw the piston 15a into the cylinder 15b pivoting the sweep 10 upwardly to the position of FIGURE 4. This will cradle the load on the sweep so that it can be transported to the stack. The hydraulic fluid will of course hold the push-off 13 and the sweep 10 in the positions shown in FIGURE 4.

When the stack is reached, the arm means 8 and 8a are raised upwardly to the level of the stack. The control valve 41 is then connected in the manner shown schematically in FIGURE 5. This vents the first line 39 connecting to the upper ends of the cylinders, and pressurizes the second line 40 connecting to the lower ends of the cylinders. The sweep 10 will first drop until it rests on the surface of the stack or until the piston 15a is fully extended. Immediately the piston 14a will be extended from the cylinder 14b to move the push-off 13 forwardly on the sweep 10 to discharge the load of hay. As will be recognized, although both cylinders are simultaneously pressurized, the piston meeting with the least resistance will be operated first.

Briefly in review of operation, the valve 41 is set to the position of FIGURE 1 which permits the sweep 10 to drop downwardly by gravity and as it is moved across the field it freely floats upwardly by virtue of the pivotal connection between the link 35 and the piston 15a permitting the connection to drop downwardly. When a load is gathered, the valve 41 is set in the position of FIGURE 4 to pivot the sweep upwardly and hold the push-off 13 in its rearmost position against the uprights 12 and 12a which limit the rearward movement of the push-off. At the stack, the arm means 8 and 8a are raised, and the valve 41 is set to the position shown in FIGURE 5 and the push-off is moved outwardly.

Thus it will be seen that I have provided an improved lift mechanism which meets the objectives and advantages hereinabove set forth. The mechanism is well suited to use for a lift on a tractor. Tractors are frequently provided with hydraulic systems by the manufacturer and a limited number of control valves. Since both of the cylinders of the present lift are operated by a single valve, it becomes unnecessary to purchase or provide additional operating valves and the tractor manufacturer's valve may be used.

It is to be understood that while the principles of the invention are shown as preferably embodied in a lift with a sweep for a hayloader and stacker, the principles also may be used to advantage in other types of loading or lifting mechanism. For example the arrangement may be adapted to use with a bucket such as used on farms for handling earth or manure and other commodities. In this instance, the bucket would be pivotally mounted on the arm means and a push-off employed in the bucket.

While the uprights 12 and 12a are illustrated as secured in place to the angle members 16 and 17, they may be pivotally mounted at their front edge. This will also provide pivotal action for the sweep.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a lift mechanism for attachment to a vehicle, arm means for attachment to the vehicle, a fork pivotally mounted at its base to the end of the arm means, an upright rigidly mounted on the base of the fork, a shaft mounted on the upright, an ejector for moving along the fork, arms connected to the shaft and to the ejector, means for pivoting said shaft, a first piston and cylinder member connected to the pivoting means for pivoting the shaft and operating the ejector, a second piston and cylinder member for changing the pivotal angle of the fork, and a link member pivotally connected to said second piston and cylinder member, said link member and second piston and cylinder member pivotally connected at one end to said arm means and at the other end to said upright with said ends being freely pivotally movable so that the fork may be moved upwardly in a floating action and said members will pivot with respect to each other without operating the second piston and cylinder member.

2. A lift mechanism in accordance with claim 1 wherein the piston of said second piston and cylinder member is connected to the link member and the cylinder is pivotally connected to the arm means.

3. A lift mechanism for mounting on a vehicle comprising an arm means for attachment to a vehicle, a fork pivotally mounted on the arm means, said fork having a base and an upright rigidly mounted on the base, a shaft pivoted on the upright, means for pivoting said shaft, an ejector for moving along the fork, arms connected to the shaft and to the ejector, a first piston and cylinder member connected to said pivoting means to operate said ejector, a second piston and cylinder member connected between said arm means and said upright for pivotally moving the fork, said fork pivotally mounted so that its weight will apply a constant downward force on said second member, a first pressure line connected to one end of the first and second cylinder members, a second pressure line connected to the other end of said first and second cylinder members, said ejector moving rearwardly and said fork moving upwardly when said first line is pressurized with the piston and cylinder member meeting the least resistance being operated first, said fork first moving downwardly and said ejector thereafter moving forwardly when said second line is pressurized, and a valve means connected to said lines for selectively pressurizing and venting said first and second lines, said valve means venting each line when the other is pressurized.

4. A lift mechanism for mounting on a vehicle comprising an arm means for attachment to a vehicle, a fork pivotally mounted on the arm means, a base for the fork, an ejector slidable along the fork, an upright for the fork rigidly mounted on the base, a shaft pivoted on the upright, an arm connected between the shaft and the ejector for moving it along the fork, an operating arm secured to said shaft, first piston and cylinder members mounted on the fork and connected to said operating arm for operating the ejector, second piston and cylinder members pivotally mounted on said arm means for pivotally moving the fork, a link pivotally mounted on said shaft for independent pivotal movement and pivotally connected to said second piston and cylinder members, a first pressure line connected to one end of said first and second cylinder members, a second pressure line connected to the other end of said first and second cylinder members, said ejector moving rearwardly on the fork and said fork moving upwardly when said first line is pressurized with the piston and cylinder member meeting the least resistance being operated first, said ejector moving forwardly and said fork moving downwardly when said second line is pressurized with the piston and cylinder member meeting the least resistance being operated first, and a valve connected to said lines for selectively pressurizing and venting said first and second lines so that the fork and ejector may be operated by a single valve and from a single pressure source, said valve venting each line when the other is pressurized.

References Cited in the file of this patent

UNITED STATES PATENTS

| | | |
|---|---|---|
| 2,437,007 | Thorns | Mar. 2, 1948 |
| 2,460,774 | Trautman | Feb. 1, 1949 |
| 2,468,424 | Brauch | Apr. 26, 1949 |
| 2,606,417 | Richey | Aug. 12, 1952 |
| 2,820,558 | Miller | Jan. 21, 1958 |